3,069,765
METHOD OF BONDING AND/OR COATING METALS

Clyde S. Simpelaar, Racine, Wis., assignor to Modine Manufacturing Company, Racine, Wis., a corporation of Wisconsin
No Drawing. Filed Dec. 12, 1956, Ser. No. 627,750
7 Claims. (Cl. 29—470)

The invention relates generally to the application of metal to an object, and more particularly to metallic coatings, bonds and the like.

In the past homogeneous metallic coatings and the like have been applied by several methods, as for example, electrolytic deposition and molten application by suitable dipping processes and the like. Likewise bonding operations have involved the liquifying of metal at the bonding area by the application of sufficient heat to raise the temperature of the bonding metal to its melting point. Obviously in all of these cases the surface of the object to which the metal is applied must be suitably prepared by means of a fluxing or wetting agent or the like to insure proper adhesion of the metallic coating to the surface to which it is applied. In the last several years a process has been developed for applying a high nickel, low phosphorous alloy on metallic surfaces, called the "Niphos" process, in which an oxide of nickel is reduced on the surface to be coated. In this process which is described in the April 15, 1954 issue of the magazine, "The Iron Age," diabasic ammonium phosphate, nickel oxide and water are made into a paste and applied to the surface, the latter being degreased by suitable means before the coating is applied. The material and objects to which it is applied is then heated in a suitable furnace or the like, utilizing atmosphere control, to bring the mixture up to a firing temperature dependent upon the ratios of the materials, which will normally vary from two to one, to twenty to one, oxide to phosphate, with an increase in phosphorous reducing the temperature required. Atmosphere control is effected by employing a suitable reducing gas, as for example, hydrogen.

The reactions involved are alleged to occur in two main presentations, the first being a reaction of diammonium phosphate with nickelous oxide and the hydrogen reducing gas to produce the eutectic alloy of nickel and phosphorous, and resulting in the formation of the side products of ammonia, water vapor and phosphine. In the second reaction, the phosphine apparently reacts with some of the nickelous oxide, which is present in excess to that required in the first reaction, to produce a mixture of nickel and a nickel phosphorous alloy. It will be apparent that in this type of operation the nickelous oxide is reduced by the reducing gas, with the additional element of phosphorous being introduced to form an eutectic alloy, thereby reducing the melting temperature required. Obviously this process also results in the formation of additional compounds such as ammonia and water which have no functional or other value.

The present invention is directed to a novel method of applying metal to an object, either for the purpose of coating the surface of the latter or for creating a bond between the object and another member or the like, with both the metal coating and the fluxing or wetting agent being released at the site in their nascent state, resulting in a degree of surface preparation heretofore unobtainable, and resulting in bonds and coatings having greatly improved characteristics over other known methods.

Another object of the invention is the development of a method of bonding by means of which accurate control of the amounts of bonding or coating materials may be effected, a factor of particular importance in connection with the application of materials having a high cost.

A further object of the invention is the development of such a method, by means of which, coatings of a single metal, of extremely high purity may be achieved when desired, or additional elements or components may be effectively utilized to provide desired constituents in the applied metal, or impart desired characteristics in the wetting or bonding action.

A further object of the invention is the development of such a method which, due to the nature and operation thereof, may be employed to coat or bond non-metallic objects, as for example, ceramics and glass.

A further object of the invention is the development of such a process which is extremely flexible, enabling the utilization of desired metals in combination with various acids or similar fluxing or wetting agents, as may be best suited for the particular material to which the metallic coating is to be applied, insuring maximum efficiency in the operation.

A further object of the invention is the development of such a method by means of which in certain applications, a metal may be applied to an object at temperatures below the melting point of the applied metal, or the base metal of an object to which it may be applied, whereby the process may utilize atomic and molecular activity rather than a mass activity, and under some conditions may be of value in providing an extremely light, more or less flash coating.

The present invention broadly contemplates the utilization of a metal-containing compound such as a metallic salt, which is adapted to undergo a chemical reaction at the site of the coating or bonding operation to release free metal from the compound and at the same time provide a suitable fluxing or wetting agent at such site. In one form of the invention, the metal salt or salts may be of an acid having the desired characteristics for use as a fluxing or wetting agent on the material to which the coating is to be applied, so that upon release of the metal, the products of the reaction would include such acid, thus available as a wetting or fluxing agent. It will be apparent that as the metal and the acid are released in a nascent state, they will have properties of affinity, purity, etc. not achievable by other processes. In one of its simplest forms, where a single metal is to be applied, the metal may be merely in the form of a metallic salt of an acid having the desired fluxing or wetting characteristics in connection with the metal to which the coating is to be applied. Thus in the case of stainless steel, for example, the acid may be one of the halides such as hydrochloride which will etch stainless steel, and assuming that the metal to be applied was silver, the salt may be silver chloride. On the other hand, if the materials to which the metal is to be applied indicate, for example, the use of sulphuric or nitric acid, the salt might be a sulphate or nitrate, respectively. As hereinafter described in detail, the salt may be suitably applied to the object and a reaction with hydrogen effected to liberate the metal from the salt, the hydrogen combining with the acid radical to produce the desired acid.

At the present time there has been and is a definite need in industry, of a scope which may be deemed critical, for an improved method of applying metal to an object, particularly in connection with bonding a plurality of members into an integral structure, by means of which a uniformly perfect bond may be achieved with techniques and equipment within the range of practicability of the average plant, particularly in view of the increased use of structures for high temperature applications in nuclear aviation and other fields.

Assuming for example that it is desired to apply silver to stainless steel or to utilize silver to bond two stainless steel members together, hydrochloric acid, which will etch stainless steel, may be employed for the fluxing or wetting agent and in accordance with the invention, a silver salt of chlorine, namely silver chloride, may be employed. The salt may be applied, for example, with water as a slurry, or in any suitable vehicle, to the object at the desired points in sufficient quantities to ultimately provide the desired amount of silver at the designated points.

In some cases it may be desirable to spray merely a relatively thin solution of the salt on the object to be coated or the desired portions thereof.

Similarly, assuming that nickel were to be deposited on a metal on which nitric acid would give the desired fluxing or wetting action, nickel nitrate could be utilized, and in like manner assuming that aluminum were to be deposited on a metal on which sulphuric acid would give the desired fluxing or wetting action, aluminum sulphate could be employed. Following the application of the material to the object, the latter may be placed in a suitable furnace or oven in a hydrogen atmosphere and brought up to a suitable firing temperature which will depend to a large extent on the specific materials employed. In the first example given, the hydrogen gas of the reducing atmosphere would displace the silver from the silver chloride salt, with the hydrogen and halide combining to produce hydrochloric acid. In the second example given, the hydrogen would combine with the nitrate, forming nitric acid and liberating the nickel, while in the third example the hydrogen would combine with the sulphate radical to form sulphuric acid and liberate the aluminum.

In all of these examples both the free metal and the acid are liberated in a nascent state at the desired site of the application of the metal to the object. Obviously, as the metal and acid are being produced in a nascent state the increased activity of the same results in considerably greater efficiency of fluxing and wetting of the surface as well as the adhesion of the applied metal thereto over ordinary types of application. This action is quite apparent in the bonding of elements together wherein the bonding metal even forms a flash coating on the elements well beyond the physical location of the original components, which flashing exhibits substantially perfect wetting and adhesion between the substances.

While I am unable at the present time to explain in detail and with certainty the successive steps and reactions, etc., which take place in the practice of the method, it is believed evident that metallic atoms and acid forming molecules are in all probability simultaneously released, the latter providing a surrounding acid vapor within which the metallic atoms or molecules coalesce and are deposited on the adjacent metal surface, the nascent acid providing exceptional wetting action and the metal having apparent very high affinity for the metal surface as evidenced from the fact that the flash coating referred to may extend for a considerable distance beyond the immediate proximity of the pre-placed salts and the uniformity and extent of the action considerably exceeds any other brazing operation heretofore observed. Experiments indicate that the process is adaptable in connection with the application of other metals, in addition to those heretofore referred to, and is believed applicable to most if not all metals. In this connection it will be noted that of all of the specific metals mentioned, silver is the only one which is below hydrogen in the chemical activity or electromotive series of the metals. Thus in the normal low temperature chemical reactions, while hydrogen would normally displace silver from compound, metals such as nickel, tin, aluminum and zinc would tend to displace the hydrogen from the acid, so that the liberation of such metals in the present process is the reverse chemical action to that which would normally be experienced at lower temperatures. It is believed that the reaction, particularly in the case of those metals which are above hydrogen in the electromotive series, is controlled by the factors involved relating to chemical equilibrium, chemical affinity, and the chemical force and resistance associated with reaction velocity.

It is of course well known that the velocity of chemical changes increases rapidly with an increase in temperature. The reaction velocity is usually designated as the ratio of chemical force to chemical resistance and at very low temperatures, such as in the immediate vicinity of absolute zero, there is no equilibrium but every chemical process advances to completion in one or the other direction. The chemical forces therefore act in one direction toward complete consumption of the reacting substance, but since the chemical resistance is then immensely great, they can produce practically no appreciable result. At higher temperatures the reaction proceeds, at least in homogeneous systems, to a certain equilibrium, and as the chemical resistance at such time has finite values, the equilibrium will always finally be reached after a longer or shorter time. Finally, at very high temperatures the chemical resistance becomes very small, and the equilibrium is almost instantaneously reached, while at the same time the affinity of the reaction may very strongly diminish and the chemical reaction may then take place, not because the chemical resistance becomes very great, but because the chemical force becomes vanishingly small.

It would appear that the reactions here involved may be somewhat analogous to the action of many other compounds, as for example, acetylene which is stable at ordinary temperatures, inasmuch as it decomposes slowly, but at the same time it is explosive, for the decomposition when once started is rapidly propagated on account of the heat evolved by the splitting up of the gas into carbon and hydrogen. At very high temperatures, however, acetylene acquires real stability, since carbon and hydrogen then react to form acetylene. It will also be appreciated that in the present process, as the reactions take place in an atmosphere of hydrogen, the hydrogen is present in vast excess to the other elements involved, with the hydrogen tending to reduce the salt to the metallic state and the formation of the acid in a vapor state. Likewise, as the hydrogen is usually being circulated, there could be a tendency for the acid vapor to be withdrawn from the reactive area, which would prevent the formation of a condition of equilibrium.

While, as previously mentioned, the displacement of silver by the hydrogen would be a normal reaction, with the metals of higher activity than hydrogen the reverse would normally be true and it is believed that the process may in many cases be satisfactorily carried out by the use of temperatures which are merely above that required to reverse the reaction. This conclusion is supported by experiment and it has been found, for example, that the nickel salt may be reduced and the metal freed at temperatures around two thousand degrees Fahrenheit, whereas the melting point of nickel is approximately twenty-six hundred and forty-five degrees F. The other metals apparently behave similarly at temperatures below their melting points, indicating that the basic reaction is molecular or atomic as distinguished from a mass action such as melting. While subsequent investigation may vary present considerations with respect to operating temperatures, it would appear that the probable temperature range for those metals that would commonly be used would be approximately 1300° F. to 2300° F.

While it would appear that excellent results may be attained with the process in connection with the application of coatings and the like at temperatures below the normal melting point of the metal, when the process is used for bonding, it would appear that best results may be obtained by utilizing an ultimate temperature slightly above the melting point of the metal being applied to permit the metal to flow, whereby an efficient and uniform fillet along the juncture of the members being bonded is obtained. Obviously, where the process is carried out at the lower temperatures, the deposited metal normally will not form a well shaped fillet as the metal not being liquid, is merely deposited from a nascent state, and thus will not flow or otherwise possess capillary characteristics, etc.

The results obtained by use of the process herein described indicates that a dense, non-porous bond or coating is achieved, which in part may be due to the greater affinity of the substances in their nascent state. The process may be of particular importance in coating metals, as for example, to aluminize or aluminum coat steel, and in view of the high degree of wettability afforded by the present process it might be used to coat copper brazed structures of low carbon steel to provide a protective aluminum coating on the steel and converting the exposed copper bond to an aluminum bronze surface. Similarly, in view of the nature of the process and the high degree of wetting, the process might have application where an extremely light flash coating somewhat similar to vacuum plating might be desired, the atomic or molecular action, as distinguished from a mass action, enabling the production of extremely thin coatings which probably may even be of single molecular thickness.

It also will be apparent that the process provides a means of obtaining metal, either as a coating or as a bond, of extremely high purity, as well as alloys, in very exact ratios, with no loss of metal, which would be of particular value in connection with coatings of the noble metals and the like. Likewise it would appear that the atomic nature of the process enables the coating and bonding of non-metals, as for example ceramics and g'ass, which normally cannot be effectively achieved by present methods, as well as enable the formation of alloys of metals which otherwise could not be alloyed by present techniques. Similarly, in addition to these advantages, the ability to coat or bond at temperatures below the melting point of the metal applied may enable the coating and bonding of materials by metal, which could not be accomplished if it were necessary to bring the applied metal up to its melting point.

It would appear that in some cases it might be possible to provide some degree of control of the application of the metal to the object by means of a suitable electric field.

Having thus described my invention, it is obvious that various immaterial modifications may be made in the same without departing from the spirit of the invention; hence I do not wish to be understood as limiting myself to the sequence of steps or the exact form, construction, arrangement and combination of parts herein shown and described, or uses mentioned.

What I claim as new and desire to secure by Letters Patent is:

1. The method of bonding two members of a metal which can be etched by an acid selected from the group consisting of hydrochloric acid, hydriodic acid, hydrobromic acid, nitric acid and sulphuric acid, which comprises the following steps: applying by preplacing a chemical composition selected from the group consisting of a silver chloride, silver iodide, silver bromide, a nickel nitrate, and an aluminum sulphate at the juncture of the two said members to be bonded in a sufficient amount to provide adequate free metal to form a desired bond between the two said members, and heating said two members and the chemical composition selected from the aforesaid group in a hydrogen atmosphere to a temperature operative to free the metal of the selected chemical composition for bonding purposes and simultaneously provide the acid of the selected chemical composition as the metal of the selected chemical composition is freed, for etching the said members being bonded with the freed metal.

2. The method of silver bonding two stainless steel members which comprises the following steps: applying by preplacing a silver chloride composition at the juncture of the two stainless steel members to be bonded in a sufficient amount to provide adequate free metal to form a desired bond between the two stainless steel members, and heating said two stainless steel members and silver chloride composition in a hydrogen atmosphere to a temperature operative to free the silver for bonding purposes and simultaneously provide the acid of such chloride as the silver is freed, for etching the stainless steel members being silver bonded with the freed silver.

3. The method of nickel bonding two members made of a metal that can be etched by nitric acid which comprises the following steps: applying by pre-placing a nickel nitrate composition at the juncture of the two said members to be bonded in a sufficient amount to provide adequate free metal to form a desired bond between the two said members, and heating said two members and nickel nitrate composition in a hydrogen atmosphere to a temperature operative to free the nickel for bonding purposes and simultaneously provide the acid of such nitrate as the nickel is freed for etching the two said members being nickel bonded with the freed nickel.

4. The method of aluminum bonding two heated metal members upon which a resultant acid from the reaction of a metallic sulphate in a hydrogen atmosphere would provide a fluxing or wetting action which comprises the following steps: applying by pre-placing an aluminum sulphate composition at the juncture of the two metal members to be bonded in a sufficient amount to provide adequate free metal to form a desired bond between the two metal members, and heating said two metal members and aluminum sulphate composition in a hydrogen atmosphere to a temperature operative to free the aluminum for bonding purposes and simultaneously provide the acid of such sulphate as the aluminum is freed, for etching the two metal members being aluminum bonded with the freed aluminum.

5. The method of aluminum coating an object of steel to provide a protective aluminum coating thereon which comprises the following steps: applying to a surface of the object an aluminum sulphate composition in a sufficient amount to provide adequate free metal to form the desired coating and heating said object and said composition in a hydrogen atmosphere to a temperature operative to free the aluminum for coating purposes and simultaneously to provide sulphuric acid for etching the said surface of the steel object so that a protective aluminum coating is provided on the said surface of the steel object.

6. The method of coating a copper brazed steel structure to provide a protective aluminum coating on the steel surface and an aluminum bronze surface on the exposed surface of the copper brazing material which comprises the following steps: applying to the surface of said structure an aluminum sulphate composition in a sufficient amount to provide adequate free metal to form the desired coating and heating said structure and said composition in a hydrogen atmosphere to a temperature operative to free the aluminum and simultaneously to provide sulphuric acid for etching the surface of said structure, said freed aluminum providing a protective aluminum coating on the exposed steel surface and an aluminum bronze surface on the exposed surface of the copper brazing material.

7. The method of metal coating a surface of a member made of a metal that can be etched by an acid selected from the group consisting of hydrochloric acid, hydrobromic acid, hydriodic acid, nitric acid and sulphuric acid, which comprises the following steps: applying to said surface a composition selected from the group consisting of silver chloride, silver bromide, silver iodide, nickel nitrate and aluminum sulphate in an amount sufficient to provide adequate free metal to form the desired coating and heating said member and said composition in a hydrogen atmosphere to a temperature operative to free said coating metal and simultaneously to form the acid for etching the surface of said member.

(References on following page)

References Cited in the file of this patent

UNITED STATES PATENTS

| | | |
|---|---|---|
| 553,296 | Aylsworth | Jan. 21, 1896 |
| 575,668 | Lodyguine | Jan. 19, 1897 |
| 600,250 | Reese | Mar. 8, 1898 |
| 986,558 | Farkas | Mar. 14, 1911 |
| 1,557,348 | Shotton | Oct. 13, 1925 |
| 1,639,575 | Robinson | Aug. 16, 1927 |
| 1,692,818 | Christoph | Nov. 27, 1928 |
| 1,806,738 | Burns et al. | May 26, 1931 |
| 1,838,370 | Dean et al. | Dec. 29, 1931 |
| 2,454,270 | Braunsdorff | Nov. 23, 1948 |
| 2,570,248 | Kelly | Oct. 9, 1951 |
| 2,627,110 | Hickey | Feb. 3, 1953 |
| 2,633,631 | Horvitz | Apr. 7, 1953 |
| 2,642,656 | Grosse | June 23, 1955 |
| 2,698,813 | Koh | Jan. 4, 1955 |
| 2,805,155 | Gelb et al. | Sept. 3, 1957 |
| 2,822,609 | Horzitz | Feb. 11, 1958 |

FOREIGN PATENTS

| | | |
|---|---|---|
| 26,292 | Great Britain | of 1903 |
| 483,156 | Great Britain | Apr. 13, 1938 |